United States Patent
Kim et al.

(10) Patent No.: US 8,422,419 B2
(45) Date of Patent: Apr. 16, 2013

(54) APPARATUS AND METHOD FOR PROVIDING WLAN SERVICE USING MULTIPLE CHANNEL

(75) Inventors: Yun-Joo Kim, Daejeon (KR); Jeeyon Choi, Daejeon (KR); Yoo-Seung Song, Daejeon (KR); Yu-Ro Lee, Daejeon (KR); Jong-Ee Oh, Daejeon (KR); Minho Cheong, Gyeonggi-do (KR); Sok-Kyu Lee, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 359 days.

(21) Appl. No.: 12/615,557

(22) Filed: Nov. 10, 2009

(65) Prior Publication Data

US 2010/0118851 A1  May 13, 2010

(30) Foreign Application Priority Data

Nov. 10, 2008 (KR) .................. 10-2008-0111030
Jan. 15, 2009 (KR) .................. 10-2009-0003486
Jan. 15, 2009 (KR) .................. 10-2009-0003487

(51) Int. Cl.
*H04B 7/14* (2006.01)
*H04B 7/15* (2006.01)
*H04B 3/36* (2006.01)
*H04W 4/00* (2009.01)

(52) U.S. Cl.
USPC ........... 370/315; 370/328; 370/338; 370/401; 455/7; 455/11.1; 455/440

(58) Field of Classification Search ......... 370/331–334, 370/338, 401, 315, 400; 455/436–444, 453, 455/7, 11.1
See application file for complete search history.

(56) References Cited

U.S. PATENT DOCUMENTS

| 7,525,943 | B2 * | 4/2009 | Iyer et al. ............... 370/338 |
| 7,826,426 | B1 * | 11/2010 | Bharghavan et al. ......... 370/331 |
| 2004/0102194 | A1 | 5/2004 | Naghian et al. |
| 2005/0078624 | A1 * | 4/2005 | Shu et al. ............... 370/328 |
| 2005/0207448 | A1 * | 9/2005 | Iyer et al. ............... 370/476 |
| 2006/0019663 | A1 | 1/2006 | Cuffaro et al. |
| 2006/0221919 | A1 | 10/2006 | McRae et al. |
| 2007/0047492 | A1 | 3/2007 | Kim et al. |
| 2008/0089276 | A1 | 4/2008 | Ito et al. |
| 2009/0290520 | A1 * | 11/2009 | Roberts et al. ............ 370/311 |
| 2010/0165910 | A1 * | 7/2010 | Mathews et al. ........... 370/315 |
| 2010/0296441 | A1 * | 11/2010 | Barkan ................... 370/328 |

FOREIGN PATENT DOCUMENTS

| KR | 1020040016665 A | 2/2004 |
| KR | 1020060106775 A | 10/2006 |
| KR | 1020080052111 A | 6/2008 |
| KR | 1020090013180 A | 2/2009 |

* cited by examiner

*Primary Examiner* — Habte Mered
(74) *Attorney, Agent, or Firm* — Ladas & Parry LLP (57) ABSTRACT

Provided are an apparatus and method for providing a WLAN service using multiple channels. The wireless local area network (WLAN) service apparatus includes a service request receiver configured to receive service request information from a first wireless terminal accessed through a first channel, a data receiver configured to receive data from a first access point accessed through a second channel according to the service request information, a data transmitter configured to transmit the data to the first wireless terminal in a predetermined service area, and an access controller configured to control the first wireless terminal and the first access point to be accessed through different channels.

14 Claims, 8 Drawing Sheets

APPARATUS AND METHOD FOR PROVIDING WLAN SERVICE USING MULTIPLE CHANNEL

BACKGROUND OF THE INVENTION

1. Field of the Invention

The present invention relates to an apparatus and method for providing a wireless local area network (WLAN) service and more particularly to an apparatus and method for providing a WLAN service using multiple channels.

2. Description of Related Art

Lately Internet population has been continuously increased. Particularly, many users use a wireless local area network (WLAN) for the Internet. A WLAN service is to provide typical services, which were used to be provided by a wired LAN service, using wireless medium for transferring data. In general, IEEE 802.11 infra-structure has been used as a wireless communication method.

The WLAN service enables a wireless terminal which called station (STA) to receive various services including a wireless Internet service using an access point (AP) as a wired/wireless gateway. For example, The wireless terminal may be apparatus such as a notebook computer or a personal digital assistance (PDA). A media access control (MAC) protocol of a WLAN defined in IEEE 802.11 substantially supports an access point (AP) and a base service set (BSS) formed of wireless terminals. The access point operates as an access point of a distributed system. That is, the access point performs similar operation of a LAN hub. One access point provides predetermined services to wireless terminals in a predetermined service area. The service area denotes coverage where an access point can provide a service to wireless terminals.

In a WLAN system, a service area of an access point is limited. Since the access point is generally fixed at a predetermined location, it is necessary for a user of a wireless terminal to move into a predetermined service area in order to use the WLAN service. If a service area of an access point is dynamically extendable, the mobility of a wireless terminal could be further guaranteed and Quality of Service (QoS) of a WLAN service could be improved.

SUMMARY OF THE INVENTION

An embodiment of the present invention is directed to providing an apparatus and method for providing a wireless local area network (WLAN) service using multiple channels in order to improve mobility of a wireless terminal and QoS thereof by expanding a service area of an access point.

In accordance with an aspect of the present invention, there is provided a wireless local area network (WLAN) service apparatus using multiple channels, including a service request receiver configured to receive service request information from a first wireless terminal accessed through a first channel, a data receiver configured to receive data from a first access point accessed through a second channel according to the service request information, a data transmitter configured to transmit the data to the first wireless terminal in a predetermined service area, and an access controller configured to control the first wireless terminal and the first access point to be accessed through different channels.

In accordance with another aspect of the present invention, there is provided a wireless local area network (WLAN) service apparatus including a service request receiver configured to receive service request information from a wireless terminal located outside of a service area of an access point, a moving unit configured to move inside or out of the service area of the access point according to the service request information, a memory configured to store data received from the access point according to the service request information, and a data transmitter configured to transmit the stored data to the wireless terminal when the wireless terminal is included in a service area of the WLAN service apparatus by movement of the moving unit.

In accordance with still another aspect of the present invention, there is provided a method for providing a wireless local area network (WLAN) service using multiple channels, including controlling a wireless terminal and an access point to access through different channels, and transmitting data received from the access point accessed through a second channel to a predetermined service area according to a service request of the wireless terminal accessed through a first channel.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
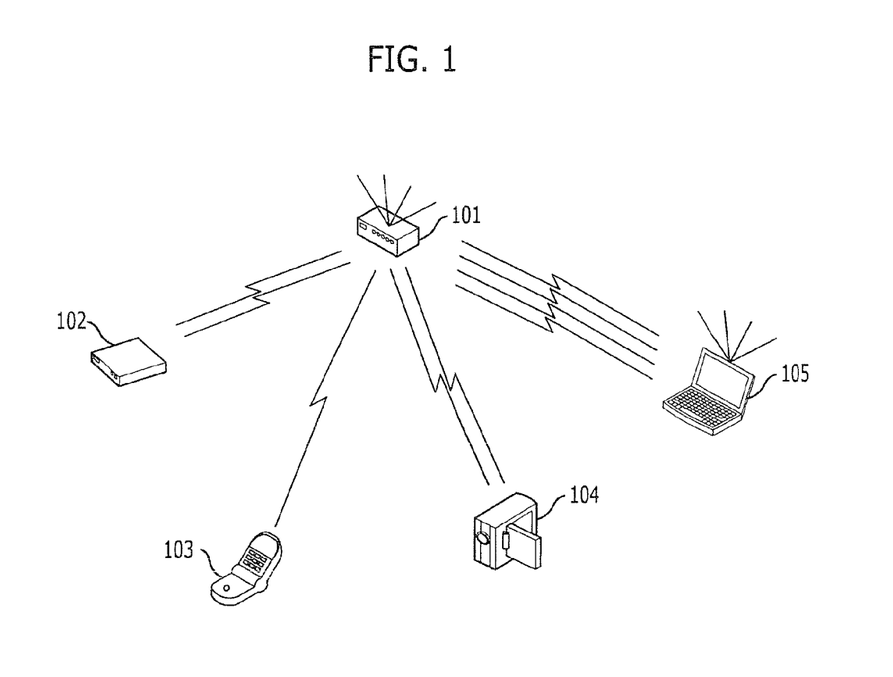
FIG. 1 is a diagram for describing an apparatus and method for providing a WLAN service using multiple channels in accordance with an embodiment of the present invention.

FIG. 1 is a diagram for describing an apparatus and method for providing a WLAN service using multiple channels in accordance with an embodiment of the present invention.

As shown in FIG. 1, an access point 101 transmits data to wireless terminals 102 to 104 in response to service requests of the wireless terminals 102 to 104 accessing to the access point 101. The access point 101 transmits data to each one of the wireless terminals 102 to 105 according to a bandwidth supported by each one of the wireless terminals 102 to 105. In FIG. 1, the number of lines between the access point and each one of the wireless terminals denotes a corresponding bandwidth size.

Since a service area of the access point 101 is limited, wireless terminals located at an outside of the service area cannot use a service provided from the access point 101. Accordingly, it is possible to further guarantee the mobility of the wireless terminal and to improve the Quality of Service (QoS) of a WLAN service by expanding the service area of the access point 101.

The wireless terminals in the service area of the access point 101 cannot transmit data to a wireless terminal not included in the service area of the access point 101. However, if the wireless terminals could additionally perform a function of an access point, it will be the same as widening a service area of an access point 101.

The apparatus and method for providing a WLAN service according to the present embodiment can expand a WLAN service area by individually accessing the access point and the wireless terminals through different channels using multiple channels. That is, the apparatus and method for providing a WLAN service according to the present embodiment simultaneously perform functions of a wireless terminal and an access point to widen the service area of the access point. For example, a wireless terminal 105 can transmit data from an access point 101 to other wireless terminals included in a service area of the wireless terminal 105. Accordingly, a WLAN service area becomes further wider.

Hereinafter, the apparatus and method for providing a WLAN service using multiple channels according to embodiments of the present invention will be described with reference to the accompanying drawings. The accompanying drawings illustrate wireless terminals or access points defined in IEEE 802.11 and support bandwidths of 20 MHz, 40 MHz, or wider.

Figure 2:
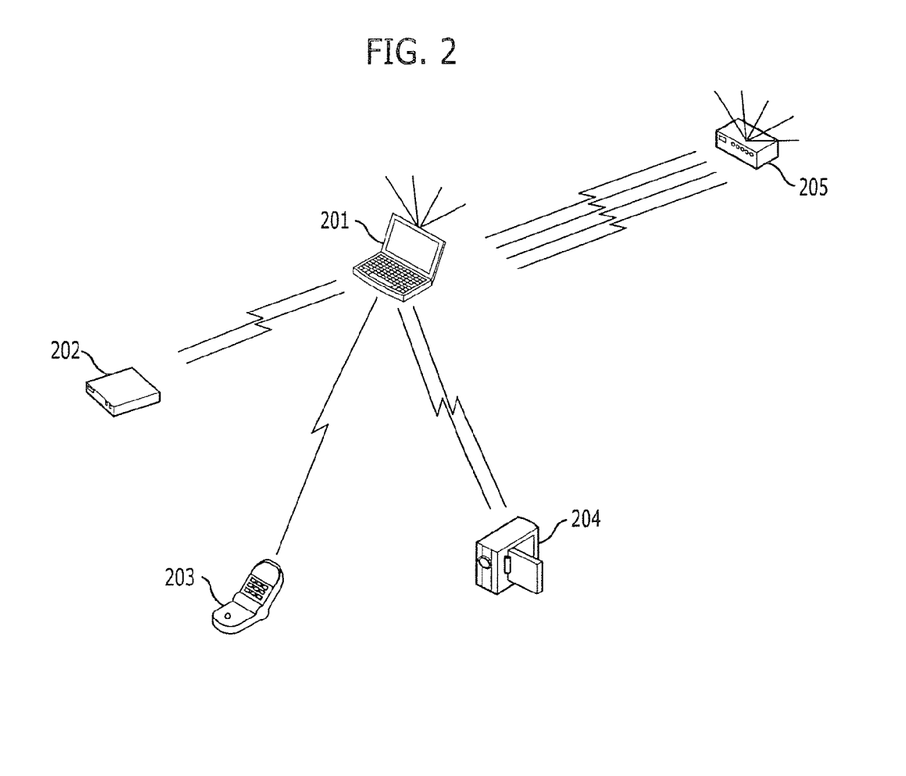
FIG. 2 is a diagram illustrating a WLAN service system using multiple channels in accordance with a first embodiment of the present invention.

FIG. 2 is a diagram illustrating a WLAN service system using multiple channels in accordance with a first embodiment of the present invention.

As shown in FIG. 2, the WLAN service system according to the present embodiment includes a wireless local area network (WLAN) service apparatus 201, first to third wireless terminals 202 to 204, and an access point 205. That is, the WLAN service apparatus 201, the first to third wireless terminals 202 to 204, and the access point 205 form one basic service set (BSS).

The service area of the access point 205 includes only the WLAN service apparatus 201. The WLAN service apparatus 201 according to the present embodiment is a wireless terminal. The WLAN service apparatus 201 request a WLAN service to the access point 205 and receives data from the access point 205.

The WLAN service apparatus 201 additionally transmits data from the access point 205 to the first to third wireless terminals 202 to 204 included in a service area of the WLAN service apparatus 201. That is, the WLAN service apparatus 201 according to the present embodiment operates as a wireless terminal in view of the access point 205 and also operates as an access point in view of the first to third wireless terminals 202 to 204.

The WLAN service apparatus 201 can provide very high throughput WLAN service by simultaneously accessing the access point and the wireless terminals using corresponding channels. That is, the WLAN service apparatus 201 accesses the access point 205 and the wireless terminals 202 to 204 using multiple channels. For example, the WLAN service apparatus 201 receives a service request from the first wireless terminal 202 through a first channel, receives data from the access point 205 through a second channel, and transmits the received data to the first wireless terminal 202 through the first channel.

According to the present embodiment, the first to third wireless terminals 202 to 204 can receive a WLAN service although the first to third wireless terminals 202 to 204 are not included in a service area of the access point 205. Therefore, the mobility of the first to third wireless terminals 202 to 204 can be further guaranteed, and the QoS of the WLAN service can be improved.

Figure 3:
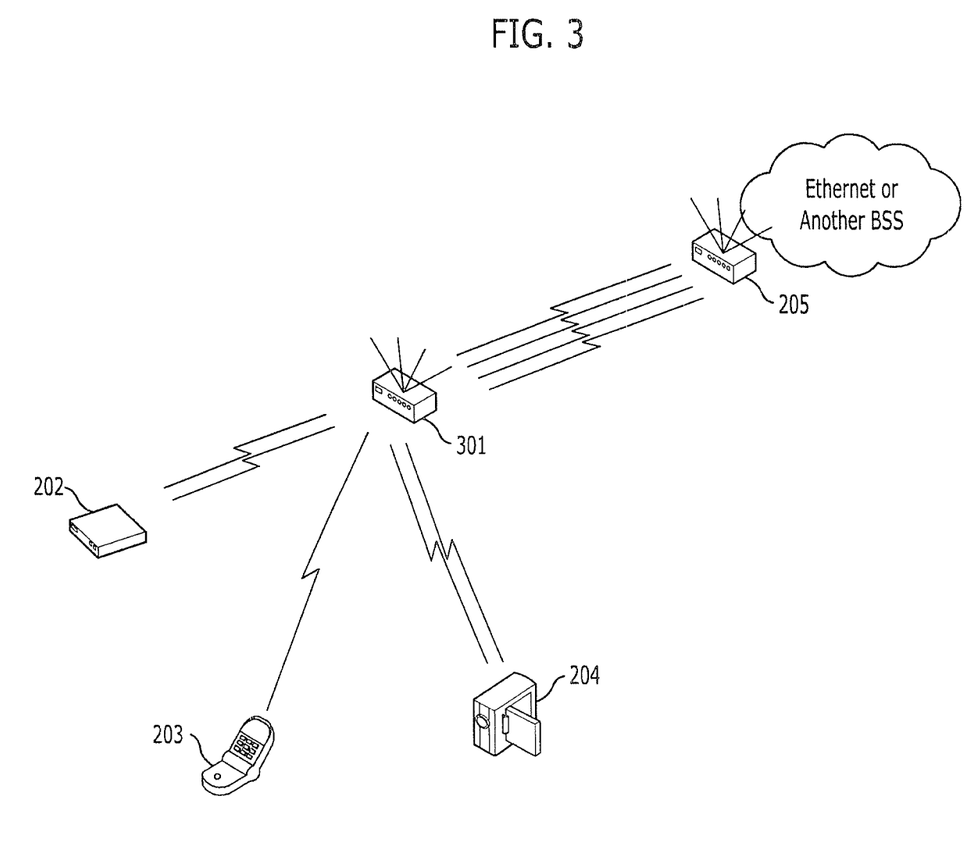
FIG. 3 is a diagram illustrating a WLAN service system using multiple channels in accordance with a second embodiment of the present invention.

FIG. 3 is a diagram illustrating a WLAN service using multiple channels in accordance with a second embodiment of the present invention.

As shown in FIG. 3, the WLAN service system according to the present embodiment includes a wireless local area network (WLAN) service apparatus 301, first to third wireless terminals 202 to 204, and an access point 205.

Unlike the WLAN service apparatus of FIG. 2, the WLAN service apparatus 301 is an access point. The WLAN service apparatus 301 provides a WLAN service to the first to third wireless terminals 202 to 204 included in a service area of the WLAN service apparatus 301. Further, the WLAN service apparatus 301 transmits data transmitted from the access point 205 to the first to third wireless terminals 202 to 204 included in the service area of the WLAN service apparatus 301. That is, the WLAN service apparatus 301 according to the present embodiment operates as a wireless terminal in view of the access point 205 and operates as an access point in view of the first to third wireless terminals 202 to 204. Like the WLAN service apparatus 201 of FIG. 2, the WLAN service apparatus 301 uses multiple channels. Accordingly, the WLAN service apparatus 301 can provide a WLAN service by simultaneously accessing the access point and the wireless terminals using corresponding channels.

Since the WLAN service apparatus 301 is an access point as described above, the WLAN service apparatus 301 provides own basic WLAN services. Further, the WLAN service apparatus 301 can provide other services provided by the access point 205. Since the WLAN service apparatus 301 transmits data from the access point 205 to the wireless terminals 202 to 204, the WLAN service apparatus 301 provides not only a service provided by the WLAN service apparatus 301 but also a service provided by the access point 205 when the access point 205 provides different services from that of the WLAN service apparatus 301, that is, when the WLAN service apparatus 301 and the access point 205 are included in different distributed systems. Therefore, the first to third wireless terminals 202 to 204 can use services provided not only by the WLAN service apparatus 301 but also by the access point 205.

That is, according to the present embodiment, it is possible to expand a WLAN service area and to provide various very high throughput services.

Figure 4:
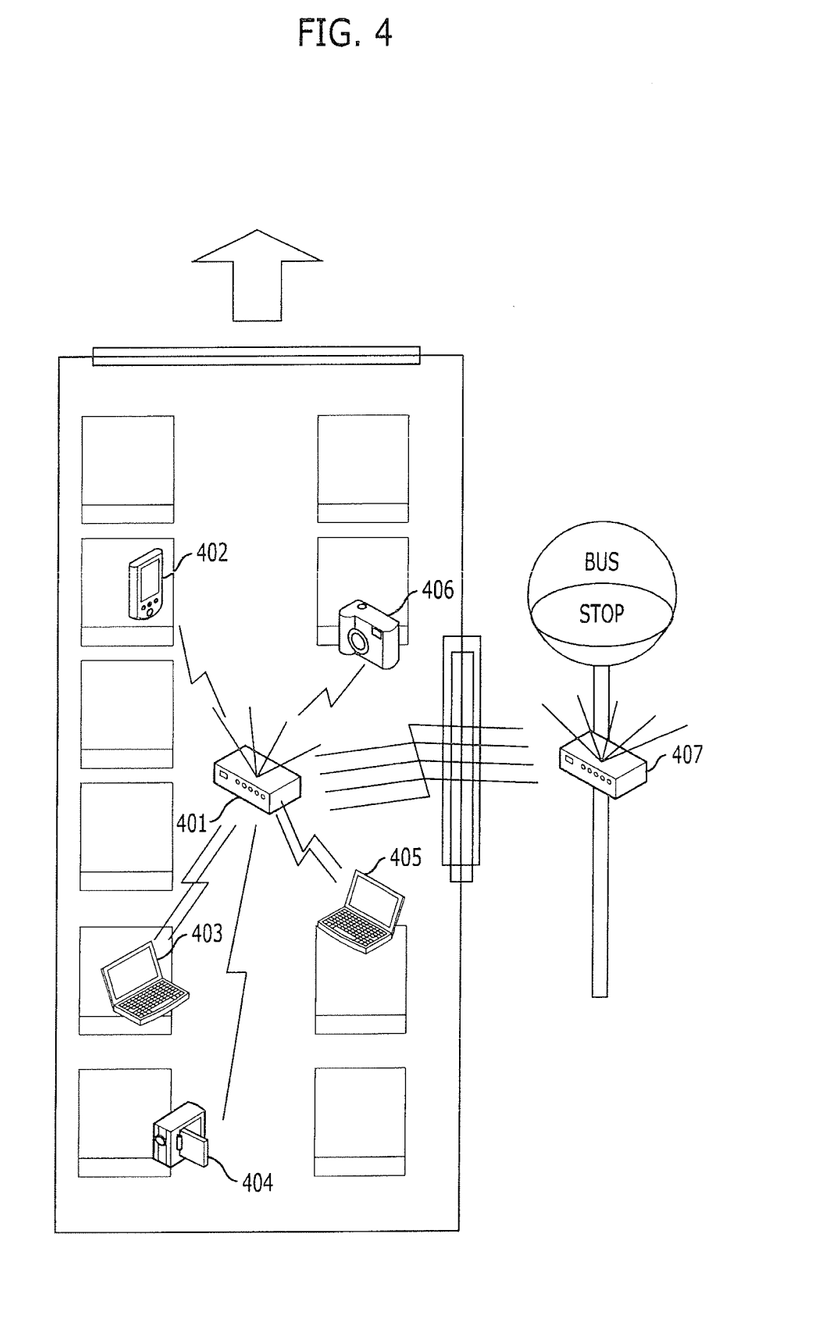
FIG. 4 is a diagram illustrating an application example of a WLAN service system in accordance with an embodiment of the present invention.

FIG. 4 is a diagram illustrating an example of using a WLAN service system in accordance with an embodiment of the present invention. A WLAN service apparatus 401 of FIG. 4 is equivalent to the WLAN service apparatuses 201 and 301 of FIGS. 2 and 3.

As shown in FIG. 4, the WLAN service apparatus 401 is included in a bus, and an access point 407 is installed at a bus stop. The WLAN service apparatus 401 receives data from the access point 407 when the bus stops at the bus stop and transmits data to a plurality of wireless terminals 402 to 406 included in the bus. The data may be various data according to a service request of a wireless terminal.

Although the WLAN service apparatus 401 is described to be installed in the bus, the WLAN service apparatus 401 may be included in various vehicles including a subway train, a vehicle, a train, a ship, an air plane, and a helicopter. Further, the access point 406 may be installed not only at the bus stops but also at traffic signal poles. The WLAN service apparatus 401 receives data from the access point 406 when a corresponding vehicle stops at the bus stop or waits for traffic signal and provides the received data to the wireless terminal.

Figure 5:
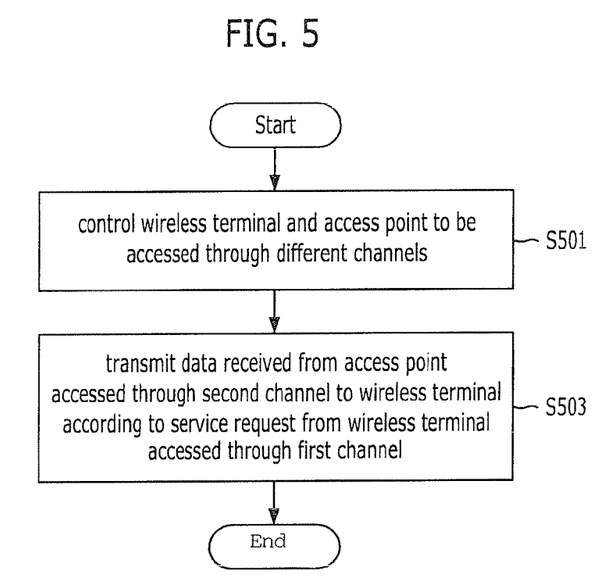
FIGS. 5 and 6 are flowcharts for describing a method for providing a WLAN service using multiple channels in accordance with an embodiment of the present invention.

FIG. 5 is a flowchart illustrating a method for providing a WLAN service using multiple channels in accordance with an embodiment of the present invention. In FIG. 5, a method for providing a WLAN service from a WLAN service apparatus 201 of FIG. 2 to a first wireless terminal 202 is described. As described above, the WLAN service apparatus 201 includes both access point function and wireless terminal function. For convenience, the WLAN service apparatus 201 will be described to include a second access point and a second wireless terminal hereinafter. An external access point 205 accessing the WLAN service apparatus 201 is also expressed as a first access point 205.

Referring to FIG. 5, the WLAN service apparatus 201 according to the present embodiment controls the first wireless terminal 202 and the first access point 205 to be accessed through different channels at step S501. Since the WLAN service apparatus 201 according to the present embodiment performs both access point function and wireless terminal function as described above, the first wireless terminal 202 and the first access point 205 are controlled to access the WLAN service apparatus 201 through different channels. The WLAN service apparatus 201 uses a Carrier Sense Multiple Access with Collision Avoidance (CSMA/CA) scheme to control the first wireless terminal 202 and the first access point 205 by a channel.

At step S503, the WLAN service apparatus 201 receives data from the first access point 205 accessed through a second channel and transmits the received data to a first wireless terminal 201 in a predetermined service area according to a service request of the first wireless terminal 202 accessed through a first channel. The predetermined service area is a service area of the WLAN service apparatus 201.

That is, at step S501, the first wireless terminal 202 accesses the WLAN service apparatus 201 through the first channel under the control of the wireless service apparatus 201 and the first access point 205 accesses the WLAN service apparatus 201 through the second channel which is different from the first channel. In more detail, the first wireless terminal 202 scans the first channel and accesses the WLAN service apparatus through the first channel and requests a predetermined service to the WLAN service apparatus 201. The WLAN service apparatus 201 scans the second channel, accesses the first access point 205 through the second channel, and transfers the service request of the first wireless terminal 202 to the first access point 205. Then, the WLAN service apparatus 201 transmits the data from the first access point 205 to the first wireless terminal 202.

Hereinafter, a procedure that the first terminal 202 and the first access point 205 access the WLAN service apparatus 201 according to the control of step S501 will be described in detail. At first, a scanning procedure of a WLAN service system will be described. In general, a wireless terminal performs a scan process for finding an available access point in a corresponding service area. Here, the wireless terminal may use an active scan scheme and a passive scan scheme.

In the active scan scheme, a wireless terminal finds an access point by receiving a probe response frame from the access point after transmitting a probe request frame to the access point. In the passive scan scheme, a wireless terminal finds an access point by receiving a beacon frame from the access point. Here, the beacon frame is a signal periodically transmitted from the access point. Then, the wireless terminal transmits an association request frame to the access point and receives an association response frame from the access point. Accordingly, an association between the wireless terminal and the access point is established.

That is, each one of the first wireless terminal 202 and the second wireless terminal performs the scan process for finding the first access point 205 and the second access point. In the present embodiment, the second wireless terminal may be connected to the second access point because the WLAN service apparatus 201 includes the second access point and the second wireless terminal. So it is necessary to independently control multiple channel access for the second wireless terminal and the second access point. The WLAN service apparatus 201 prevents the second access point from accessing the second wireless terminal by independently controlling multiple channel access.

At first, the WLAN service apparatus 201 can control multiple channel access by transmitting a probe response frame or a beacon frame that include an address different from a MAC address of the WLAN service apparatus 201 as a destination address to a predetermined service area. In more detail, the second access point transmits a probe response frame or a beacon frame that does not include a MAC address of the WLAN service apparatus 201 as a destination address to a predetermined service area under the control of the WLAN service apparatus 201. For example, the second access point discards the probe response frame that include the MAC address of the WLAN service apparatus 201 as a destination address in response to probe request frame of the second wireless terminal. And the second access point transmits a probe response frame without a MAC address of the WLAN service apparatus included as a destination address to the service area.

Since the probe response frame or the beacon frame does not includes the MAC address of the WLAN service apparatus 201 as a destination address, the second wireless terminal cannot find the second access point and transmit an association request frame to the second access point.

Further, the WLAN service apparatus 201 can control multiple channel access by discarding a received probe response frame or a received beacon frame when a MAC address included in the received probe response frame or the received beacon frame is a MAC address of the WLAN service apparatus 201. That is, the second wireless terminal is prevented from accessing the second access point by discarding a received probe response frame or a received beacon frame when the second wireless terminal receives a probe response frame or a beacon frame transmitted from the second access point or by performing a frame check sequence (FCS) check process on a probe response frame or a beacon frame.

Also, the WLAN service apparatus 201 transmits a beacon frame for a first channel to a service area of the second access point when the first access point 205 accesses the WLAN service apparatus 201 prior to the first wireless terminal 202. That is, the WLAN service apparatus 201 transmits the beacon frame for the first channel to a predetermined service area by selecting the first channel in order to enable the first wireless terminal 202 to access the second access point. Since the first access point 205 already accesses the second wireless terminal through the second channel, the WLAN service apparatus 201 can generate a beacon frame for the first channel by selecting the first channel which is a remaining channel.

Moreover, the WLAN service apparatus 201 can control multiple channel access by scanning the second channel when the first wireless terminal 202 accesses the WLAN service apparatus 201 prior to the first access point 205. That is, the second wireless terminal can find the first access point 205 by scanning only the second channel because the first wireless terminal 202 already accesses the second point through the first channel. A method of scanning the second channel will be described with reference to FIG. 6 as follows.

Figure 6:
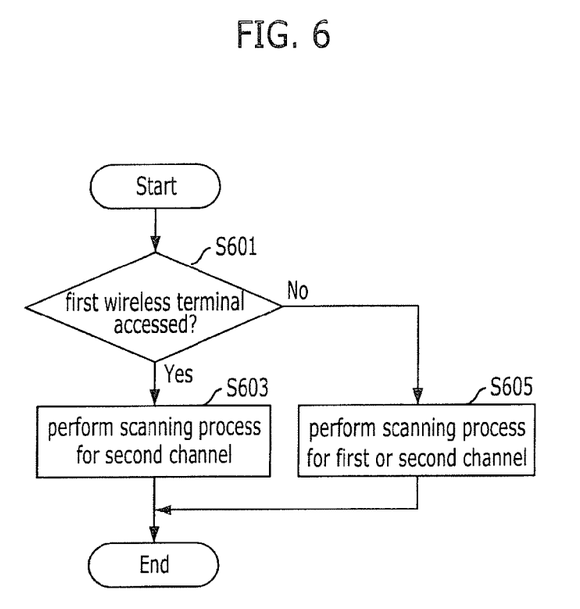

The WLAN service apparatus 201 determines whether the first wireless terminal 202 is accessed or not at step S601. If the first wireless terminal 202 is accessed at step S601, the WLAN service apparatus 201 performs a scanning process for the second channel at step S603. If the first wireless terminal 202 is not accessed at step S601, the WLAN service apparatus 201 performs a scanning process for the first channel or the second channel at step S605.

Figure 7:
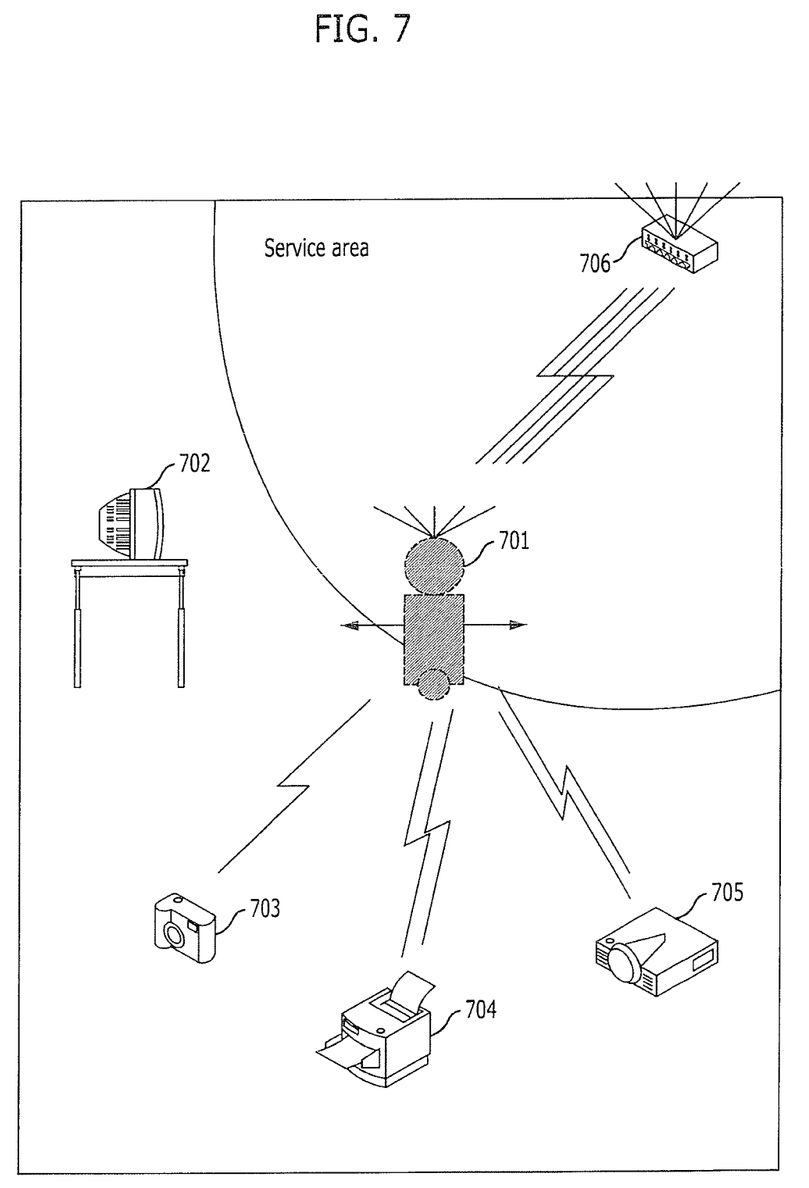
FIG. 7 is a diagram illustrating a WLAN service system using multiple channels in accordance with a third embodiment of the present invention.

FIG. 7 is a diagram illustrating a WLAN service system using multiple channels in accordance with a third embodiment of the present invention.

As shown in FIG. 7, the WLAN service system according to the present embodiment includes a WLAN service apparatus 701, first to fourth wireless terminals 702 to 705, and an access point 706. The WLAN service apparatus 701 of FIG. 7 additionally includes a mobile unit unlike the WLAN service apparatus 201 of FIG. 2. For example, the WLAN service apparatus 701 is included in a robot to additionally apply the mobility to the WLAN service apparatus 701 in FIG. 7.

The WLAN service apparatus 701 transfers data transmitted from the access point 706 to the first to the fourth wireless terminals 702 to 705 while traveling from an inside of a service area of the access point 706 to an outside of the service area of the access point 706. That is, the WLAN service apparatus 701 receives a service request from the first to fourth wireless terminals 702 to 705 accessed from the outside of the service area of the access point 706 through a first channel, moves to the inside of the service area of the access point 706, receives data from the access point 706 accessed through a second channel, and stores the received data. Then, the WLAN service apparatus 701 travels to an own service area of the WLAN service apparatus 701 to include the first to fourth wireless terminals 702 to 705 and transmits the stored data to the first to fourth wireless terminals 702 to 705.

As described above, the service area of the access point 706 can be expanded. That is, the WLAN service apparatus 701 can provide a predetermined service of the access point 706 to the first to fourth wireless terminals 702 to 705 which are not included in the service area of the access point 706. Particularly, the WLAN service system according to the present embodiment can be applied to provide a large data service such as an image file, a moving image file, and an e-mail. Further, it is possible to reduce overhead caused a re-accessing problem which may be occurred when the WLAN service 701 accesses the access point 706 and the first to fourth wireless terminals 702 to 705 through multiple channels.

Meanwhile, the WLAN service apparatus 701 may not use multiple channels. That is, since the WLAN service apparatus 701 stores data transmitted from an access point and transmits the stored data to a wireless terminal, it is not necessary for the WLAN service apparatus 701 to operate as an access point and a wireless terminal at the same time. Therefore, the WLAN service apparatus 701 may use only one channel to provide a WLAN service. In this case, the WLAN service apparatus 701 may repeat a procedure of accessing each one of the first to fourth wireless terminals 702 to 705 and the access point 706 while the WLAN service apparatus 701 is traveling.

Figure 8:
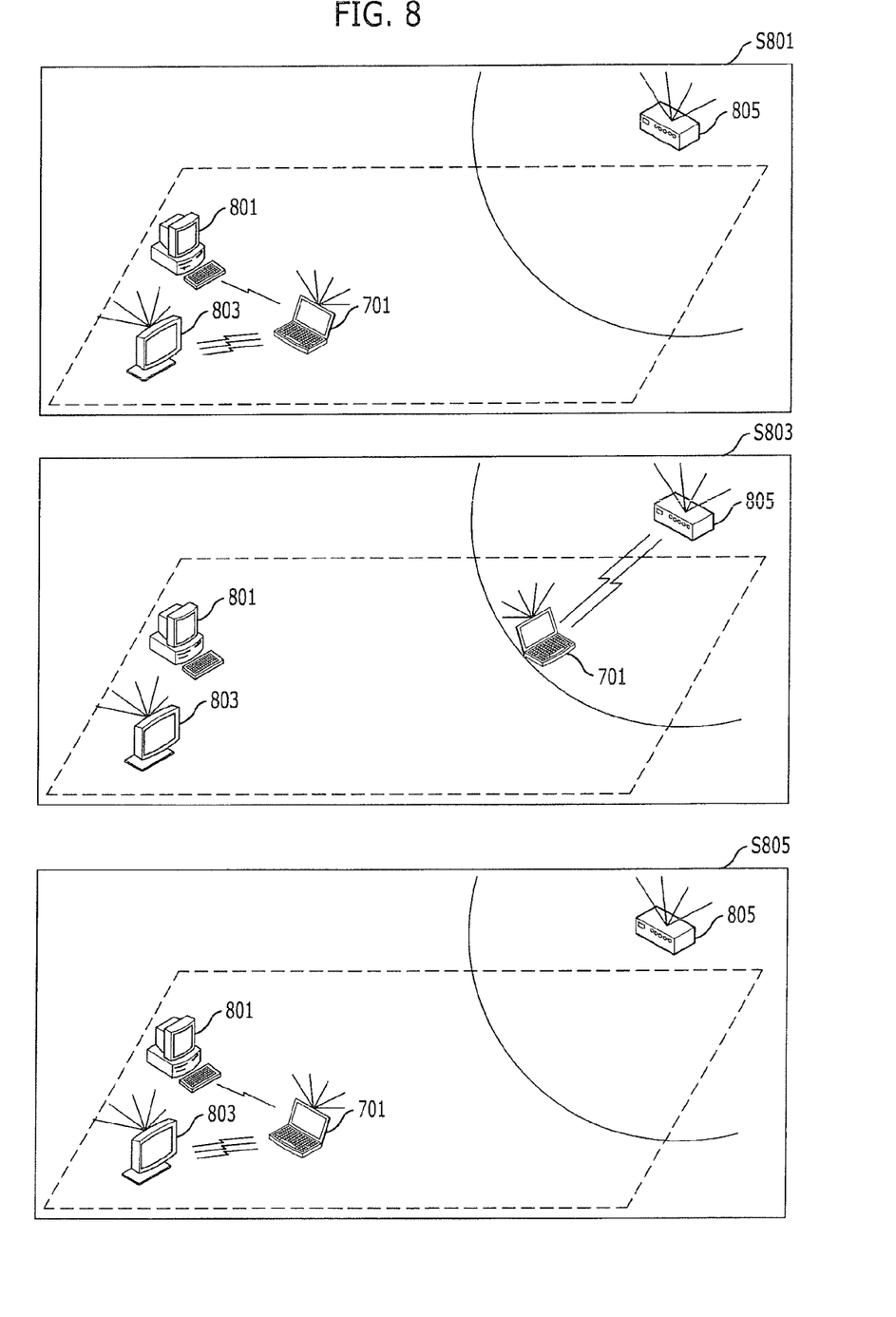
FIG. 8 is a diagram illustrating an application example of a WLAN service system of FIG. 7.

FIG. 8 is a diagram illustrating application examples of the WLAN service system of FIG. 7.

The WLAN service apparatus 701 receives a WLAN service request from a first wireless terminal 801 or a second wireless terminal 803 through a first channel at step S801. That is, the WLAN service apparatus 701 forms a basic service set (BSS) with the first and second wireless terminals 801 and 803.

The WLAN service apparatus 701 travels to a service area of the access point 805 according to a service request, receives data from the access point 805 accessed through a second channel according to a service request of the first terminal 801 or the second wireless terminal 803, and stores the received data at step S803. That is, the WLAN service apparatus 701 forms a BBS with the access point 805. Here, the WLAN service apparatus 701 may already store location information of the access point 805 and move to a service area of the access point 805 using the stored location information. The WLAN service request information may include traffic classification (TCLAS) information and traffic specification (TSPEC) information which include service information, user information, service requirement information such as QoS. The WLAN service apparatus 701 may use the TCLAS information and the TSPEC information to request a service to the access point 805.

The WLAN service apparatus 701 travels to an own service area to include the first wireless terminal 801 and the second wireless terminal 803 and transmits the stored data to the first wireless terminal 801 or the second wireless terminal 803 at step S805.

Figure 9:
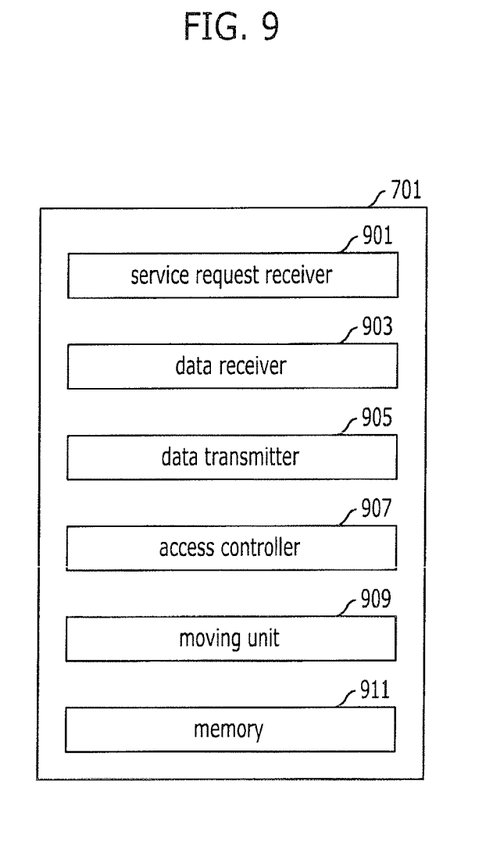
FIG. 9 is a diagram illustrating an apparatus for providing a WLAN service in accordance with an embodiment of the present invention.

FIG. 9 is a diagram illustrating a WLAN service apparatus in accordance with an embodiment of the present invention. For example, the WLAN service apparatus 701 of FIG. 7 is described in FIG. 9. However, unlike FIG. 7, the first wireless terminal 702 is included in a service area of the WLAN service apparatus 701 without travelling of the WLAN service apparatus 701 and the third wireless terminal 704 is included in a service area of the WLAN service apparatus 701 according to the travelling of the WLAN service apparatus 701.

As shown in FIG. 9, the WLAN service apparatus 701 includes a service request receiver 901, a data receiver 903, a data transmitter 905, an access controller 907, a moving unit 909, and a memory 911.

The service request receiver 901 receives service request information from a first wireless terminal 702 accessed through a first channel. The data receiver 903 receives data from an access point 706 accessed through a second channel. That is, the WLAN service apparatus 701 according to the present embodiment performs an access point function and a wireless terminal function at the same time. Therefore, the first wireless terminal 702 and the access point 706 must use different channels to access the WLAN service apparatus 701. The access controller 907 controls the first wireless terminal 702 and the access point 706 to access the WLAN service apparatus 701 through different channels.

The data transmitter 905 transmits the received data to the first wireless terminal 701 in a predetermined service area of the WLAN service apparatus 701. The predetermined service area is a service area of the WLAN service apparatus 701.

As described above, the access controller 907 controls the first wireless terminal 702 and the access point 706 to access the WLAN service apparatus 701 through different channels.

The moving unit 909 moves into or out of the service area of the access point 706 according to a service request of the third wireless terminal 704 through a third channel. That is, the third wireless terminal 704 is included in a service area of the WLAN service apparatus 701, and the moving unit 909 moves the WLAN service apparatus 701 to move inside the service area of the access point 706 according to a service request of the third wireless terminal 704.

The memory 911 stores received data. By storing the received data, the memory 911 enables the WLAN service apparatus 701 to transmit the stored data to the third wireless terminal 704 after moving to the own service area for including the third wireless terminal 704.

Although it is not shown in FIG. 9, the WLAN service apparatus 701 according to the present embodiment further includes at least one of a first frame transmitter, a frame receiver, a second frame transmitter, and a scanner. Each one of the first frame transmitter, the frame receiver, the second frame transmitter, and the scanner accesses the first wireless terminal and the first access point through different channels in response to the control of the access controller 907. That is, each one of the first frame transmitter, the frame receiver, the second frame transmitter, and the scanner is prevented from accessing the second point and the second wireless terminal as shown in FIG. 5.

The first frame transmitter transmits a probe response frame or a beacon frame without a MAC address of the WLAN service apparatus 701 included as a destination address to a service area of the WLAN service apparatus 907 in response to the control of the access controller 907.

The frame receiver discards a probe response frame or a beacon frame in response to the control of the access controller 907 when a MAC address included in the received probe response frame or the received beacon frame is a MAC address of the WLAN service apparatus 701.

When the access point 706 is accessed prior to the first wireless terminal 702, the second frame transmitter transmits a beacon frame for a first channel to a service area of the WLAN service apparatus 907 in response to the control of the access controller 907.

When the first wireless terminal 702 is accessed prior to the access point 706, the scanner performs a scanning process for a second channel in response to the control of the access controller 907.

Meanwhile, in the WLAN service system of FIGS. 2 and 3, the WLAN service apparatuses 201 and 301 may be configured without the moving unit 909 and the memory 911. In the WLAN service system of FIG. 3, the WLAN service apparatus 301 may be an access point providing services different from the first access point 706.

Figure 10:
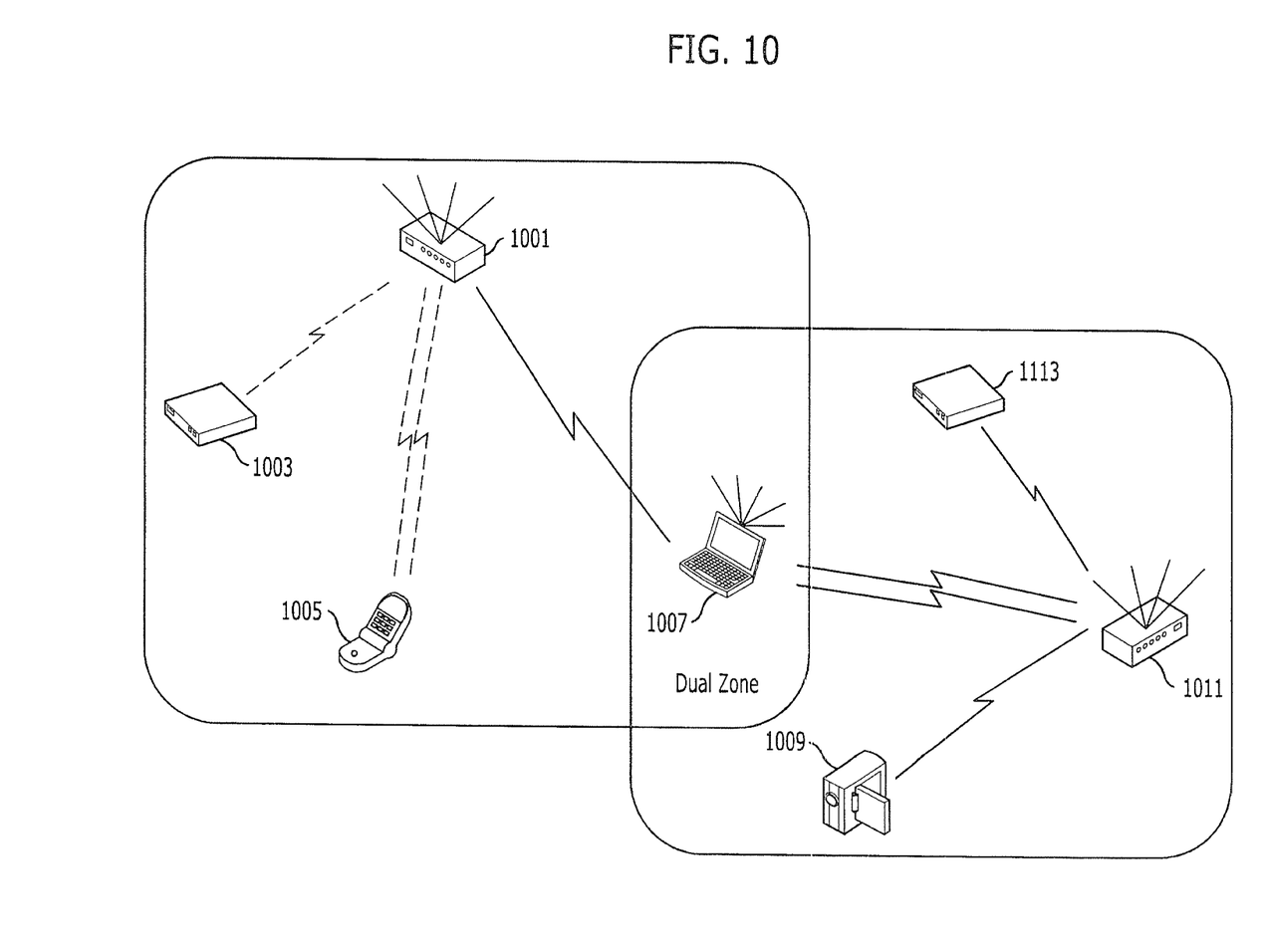
FIG. 10 is a diagram illustrating a WLAN service system in accordance with a fourth embodiment of the present invention.

FIG. 10 is a diagram illustrating a WLAN service system in accordance with a fourth embodiment of the present invention.

As shown in FIG. 10, the WLAN service system according to the present embodiment includes first and second access points 1001 and 1011, first to fourth terminals 1003, 1005, 1009, and 1113, and a WLAN service apparatus 1007. The first access point 1001 does not support multiple channel access and the second access point 1011 supports multiple channel access. In FIG. 10, a dotted line between an access point and a wireless terminal denote a not connected state.

Unlike the above mentioned WLAN service apparatus, the WLAN service apparatus 1007 of FIG. 10 additionally accesses an access point. That is, the WLAN service apparatus 1007 according to the present embodiment can access the first and second access points 1001 and 1011 through different channels and receive data from the first and second access points 1001 and 1011 according to a service request. The WLAN service apparatus 1007 can request the same or different services to the first and second access points 1001 and 1011.

In more detail, the WLAN service apparatus 1007 is located at a dual zone. Here, the dual zone is an area where the WLAN service apparatus 1007 receives same amplitude signals from more than two different access points. Since the signals of the dual zone are not significantly interfered to each other, the WLAN service apparatus 1007 can receive data from two different access points. The WLAN service apparatus 1007 determines the intensity of a signal using channel information such as SNR transmitted from an access point and determines whether it is located at the dual zone or not based on the determination result. Here, frequency of signals transmitted from the first and second access points 1001 and 1011 may be different, or the WLAN service apparatus 1007 can access the first and second access points 1001 and 1011 by performing beamforming for each one of signals transmitted from the first and second access points 1001 and 1011.

When the signals of the first and second access points 1001 and 1011 received in the dual zone have strong intensity and less interference, the WLAN service apparatus 1007 can request a service to each one of the first and second access points 1001 and 1011 by separating one data from the other. The WLAN service apparatus 1007 receives data from the first access point 1001, which is different from data from the second access point 1011. Therefore, the WLAN service apparatus 1007 according to the present embodiment can support a large data service.

When one of the signals of the first and second access points 1001 and 1011 has weak intensity, the WLAN service apparatus 1007 can recover data having error, which is received from an access point having a signal with weak intensity, by receiving data from an access point has a signal with storing intensity. The WLAN service apparatus 1007 can support seamless handoff.

A state denoting that the WLAN service apparatus 1007 is included in a dual zone can be set in MAC. The WLAN service apparatus 1007 can access the first and second access points 1001 and 1011 through different channels by transmitting an access request frame after receiving a beacon frame from each one of the first and second access points 1001 and 1011. The WLAN service apparatus 1007 performs a back off process with the first and second access points 1001 and 1011 according to a channel state by a channel or perform a control process or a NAV control process to maintain a virtual channel as BUSY/IDLE.

Like the WLAN service apparatus 201 of FIG. 2, the WLAN service apparatus 1007 may operate as an access point and transmit data from the first and second access points 1001 and 1011 to wireless terminals included in a service area of the WLAN service apparatus 1007.

According to the embodiments of the present invention, a service area of an access point can be expanded and quality of a service (QoS) can be improved by accessing both access point and wireless terminal using multiple channels and transferring data received from the access point to the wireless terminal.

According to the embodiments of the present invention, a service area of an access point can be expanded by applying mobility to a WLAN service apparatus that transmits data received from an access point to wireless terminals.

Meanwhile, the method for transmitting and receiving broadcasting service information according to the present embodiment can be realized as a program and stored in a computer-readable recording medium such as CD-ROM, RAM, ROM, floppy disks, hard disks, magneto-optical disks, and the like. Since the process can be easily implemented by those skilled in the art to which the present invention pertains, further description will not be provided herein.

The present application contains subject matter related to Korean Patent Application No. 2008-0111030, filed in the Korean Intellectual Property Office on Nov. 10, 2008, Korean Patent Application No. 2009-0003486, filed in the Korean Intellectual Property Office on Jan. 15, 2009, and Korean Patent Application No. 2008-0003487, filed in the Korean Intellectual Property Office on Jan. 15, 2009, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. A wireless local area network (WLAN) service apparatus using multiple channels, comprising:
    a service request receiver configured to receive service request information from a first wireless terminal accessed through a first channel;
    a data receiver configured to receive data from a first access point accessed through a second channel, different from the first channel, according to the service request information;
    a data transmitter configured to transmit the data to the first wireless terminal in a predetermined service area;
    an access controller configured to control the first wireless terminal and the first access point to be accessed through different channels, and
    a frame receiver configured to discard a received probe response frame or a received beacon frame in response to control of the access controller when a MAC address included in the received probe response frame or the received beacon frame is a MAC address of the WLAN service apparatus.

2. The WLAN service apparatus of claim 1, further comprising a frame transmitter configured to transmit a probe response or a beacon frame that include an address different from a MAC address of the WLAN service apparatus as a destination address to the service area in response to control of the access controller.

3. The WLAN service apparatus of claim 1, further comprising a frame transmitter configured to transmit a beacon frame for the first channel to the service area in response to control of the access controller when the first access point is accessed prior to the first wireless terminal.

4. The WLAN service apparatus of claim 1, further comprising a scanner configured to perform a scan process for the second channel in response to control of the access controller when the first wireless terminal is accessed prior to the first access point.

5. The WLAN service apparatus of claim 1, further comprising:
    a moving unit configured to move into or out of a service area of the first access point in response to a service request of a third wireless terminal accessed through a third channel; and
    a memory configured to store the data.

6. The WLAN service apparatus of claim 1, wherein the apparatus is a second wireless terminal supporting a WLAN service or a second access point providing a service different from the first access point.

7. A wireless local area network (WLAN) service apparatus comprising:
    a service request receiver configured to receive service request information from a wireless terminal located outside of a service area of an access point;
    a moving unit configured to move into or out of the service area of the access point according to the service request information;
    a memory configured to store data received from the access point according to the service request information; and
    a data transmitter configured to transmit the stored data to the wireless terminal when the wireless terminal is included in a service area of the WLAN service apparatus by movement of the moving unit.

8. A method for providing a wireless local area network (WLAN) service of a WLAN service apparatus using multiple channels, comprising:
    controlling a wireless terminal and an access point to access through different channels;
    transmitting data received from the access point accessed through a second channel to a predetermined service area according to a service request of the wireless terminal accessed through a first channel; and
    discarding a received probe response frame or a received beacon frame when a MAC address included in the received probe response frame or the received beacon frame is a MAC address of the WLAN service apparatus in response to the control.

9. The method of claim 8, further comprising:
transmitting a probe response frame or a beacon frame that include an address different from a MAC address of the WLAN service apparatus as a destination address to the service area in response to the control.

10. The method of claim 8, further comprising:
transmitting a beacon frame for the first channel when the access point is accessed prior to the wireless terminal in response to the control.

11. The method of claim 8, further comprising:
performing a scanning process for the second channel when the wireless terminal is accessed prior to the access point in response to the control.

12. The wireless local area network (WLAN) service apparatus of claim 1 wherein the access controller comprises a second access point and a second wireless terminal, and is configured to prevent the second access point from accessing the second wireless terminal.

13. The wireless local area network (WLAN) service apparatus of claim 12 wherein the access controller prevents the second access point from accessing the second wireless terminal by discarding probe response and beacon frames having a media access control (MAC) address of the WLAN service apparatus.

14. The wireless local area network (WLAN) service apparatus of claim 7 wherein the service request receiver is configured to receive the service request information through a first channel, and communicate with the access point through a second channel, different from the first channel.

* * * * *